(12) United States Patent
Stevens (10) Patent No.: US 7,431,105 B2
(45) Date of Patent: Oct. 7, 2008

(54) GEOTHERMAL HEAT LOOP INSTALLATION

(76) Inventor: Joseph W. Stevens, 5405 N. Arm Dr., Mound, MN (US) 55364

( * ) Notice: Subject to any disclaimer, the term of this patent is extended or adjusted under 35 U.S.C. 154(b) by 178 days.

(21) Appl. No.: 11/492,260

(22) Filed: Jul. 25, 2006

(65) Prior Publication Data

US 2008/0023228 A1    Jan. 31, 2008

(51) Int. Cl.
 E21B 7/02    (2006.01)
 E21B 19/08   (2006.01)
 E21B 41/00   (2006.01)
(52) U.S. Cl. .......................... 175/57; 175/113; 175/122
(58) Field of Classification Search ................... 175/57, 175/113, 122
 See application file for complete search history.

(56) References Cited

U.S. PATENT DOCUMENTS

| | | | | |
|---|---|---|---|---|
| 3,833,072 A | * | 9/1974 | Back | ............................ 175/85 |
| 3,994,350 A | | 11/1976 | Smith et al. | |
| 4,719,978 A | * | 1/1988 | Klemm | ........................ 175/113 |
| 4,860,837 A | | 8/1989 | Robert | |
| 5,018,588 A | * | 5/1991 | Haberer | ........................ 173/185 |
| 5,213,169 A | * | 5/1993 | Heller | ........................ 175/122 |
| 5,630,477 A | * | 5/1997 | Minatre | ........................ 173/184 |
| 5,762,148 A | | 6/1998 | Kattentidt et al. | |
| 6,112,833 A | | 9/2000 | Lambert | |
| 6,533,045 B1 | | 3/2003 | Cooper | |
| 6,536,541 B2 | | 3/2003 | Pedrilli | |
| 2007/0245729 A1 | * | 10/2007 | Mickleson | .................. 60/641.3 |

\* cited by examiner

*Primary Examiner*—Shane Bomar
(74) *Attorney, Agent, or Firm*—Brooks, Cameron & Huebsch, PLLC (57) ABSTRACT

Methods and apparatuses associated with a rotary driven well drilling rig. One method includes providing a rig having: an erectable mast; a head drive unit for rotatably driving drill pipes into a surface; a pumping unit to deliver a fluid through a drill pipe secured to the head drive, the fluid being forced out a bottom end of the drill pipe and up to the surface along the outside of the drill pipe during a borehole drilling operation; and a deck unit pivotally mounted on a turret attached to a set of tracks. This method embodiment includes, while the rig is in a first location, performing a first borehole drilling operation to form a first borehole at a second location; and performing a second borehole drilling operation to form a second borehole at a third location while the rig remains in the first location.

21 Claims, 6 Drawing Sheets

GEOTHERMAL HEAT LOOP INSTALLATION

TECHNICAL FIELD

The present disclosure relates generally to drilling rigs and, more particularly, to rotary driven well drilling rigs for geothermal heat loop installation.

BACKGROUND

Rotary driven well drilling rigs can be used to create boreholes of various sizes for a variety of purposes. For example, such rotary driven rigs can be used to form boreholes for geothermal heat loop installation. Geothermal heat loop systems use the earth as a constant source of heat to be extracted by a heat pump. Extracting heat from the ground, which can have a near constant temperature, can be more efficient than extracting heat from the air, which can be subject to extreme temperature variations. Such geothermal systems can reduce heating/cooling costs and are environmentally friendly by reducing the use of fossil fuels to heat/cool homes and buildings, for example.

Geothermal heat loops can be installed to heat and/or cool homes, schools, churches, commercial buildings, etc. The heat loop installation process can involve drilling a number of boreholes into which the loops are placed. The boreholes are often drilled using wet/air rotary drill rigs. Many current rotary well drilling rigs consist of boring machinery mounted atop large trucks that can weigh 15 tons or more exerting a ground contact pressure of 45-50 pounds per square inch (psi).

Operating current rotary well drilling rigs can be damaging to property. The heavy truck mounted drilling rigs can leave large piles of cuttings and muddy streams of run-off water along with numerous tire ruts throughout a drilling area. The damage can be exacerbated as current drilling rigs often drill a single borehole while having to move the entire truck to another location to drill subsequent boreholes.

As such, it can be especially undesirable to use current wet/air rotary drilling rigs in order to drill boreholes in areas where landscaping can be important, such as in residential areas or around school playgrounds, for example.

DETAILED DESCRIPTION

The present disclosure includes various methods and devices for geothermal heat loop installation. One method embodiment includes providing a rotary driven well drilling rig that comprises an erectable mast, a head drive unit capable of linear movement along the mast for rotatably driving drill pipes into a surface, a pumping unit to deliver a fluid through a drill pipe secured to the head drive, the fluid being forced out a bottom end of the drill pipe and up to the surface along the outside of the drill pipe during a borehole drilling operation, and a deck unit pivotally mounted on a turret attached to a set of tracks, the deck unit supporting the mast. The method further includes, while the rig is in a first location, performing a first borehole drilling operation to form a first borehole at a second location, and performing a second borehole drilling operation to form a second borehole at a third location while the rig remains in the first location.

Figure 1A:
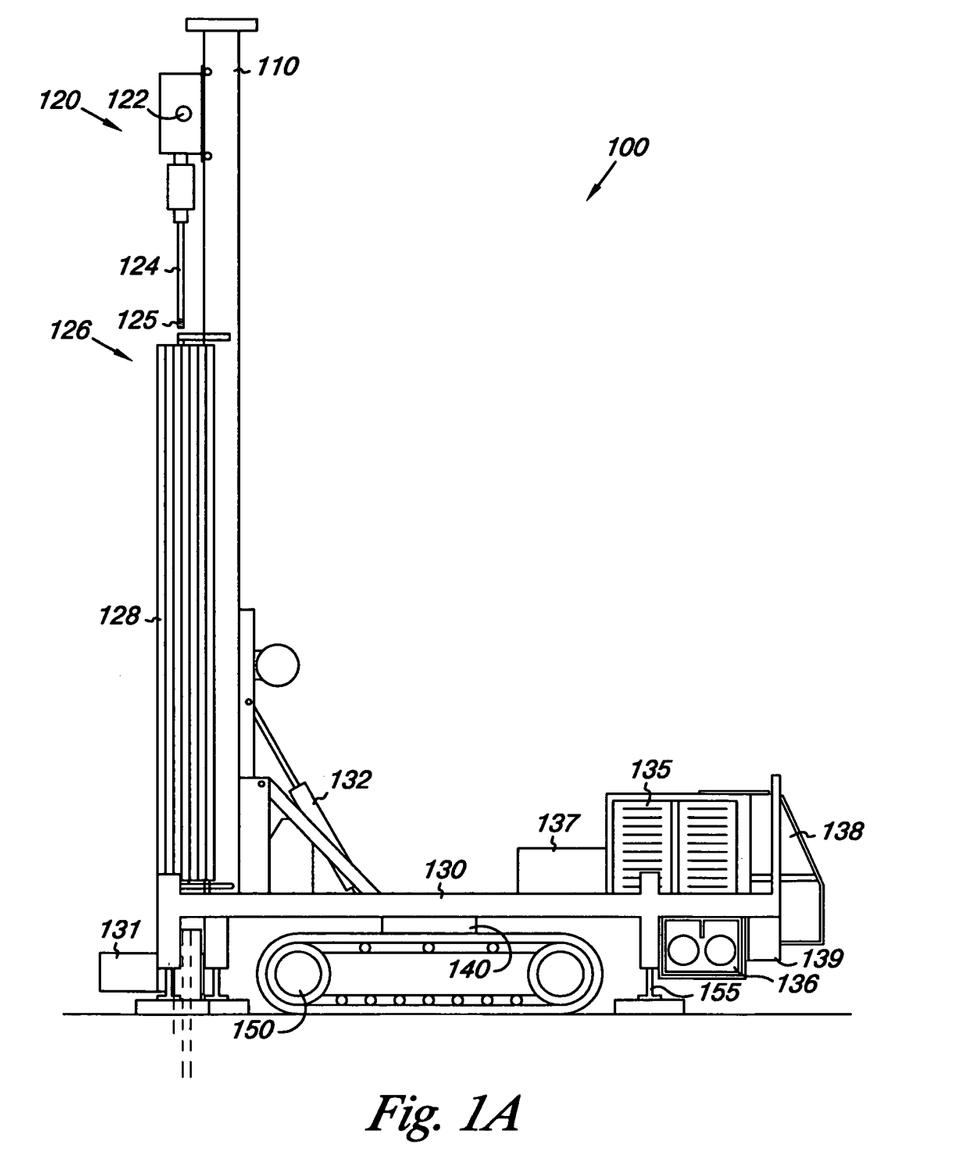
FIG. 1A is a side view of a rotary driven well drilling rig according to an embodiment of the present disclosure.
Figure 1B:
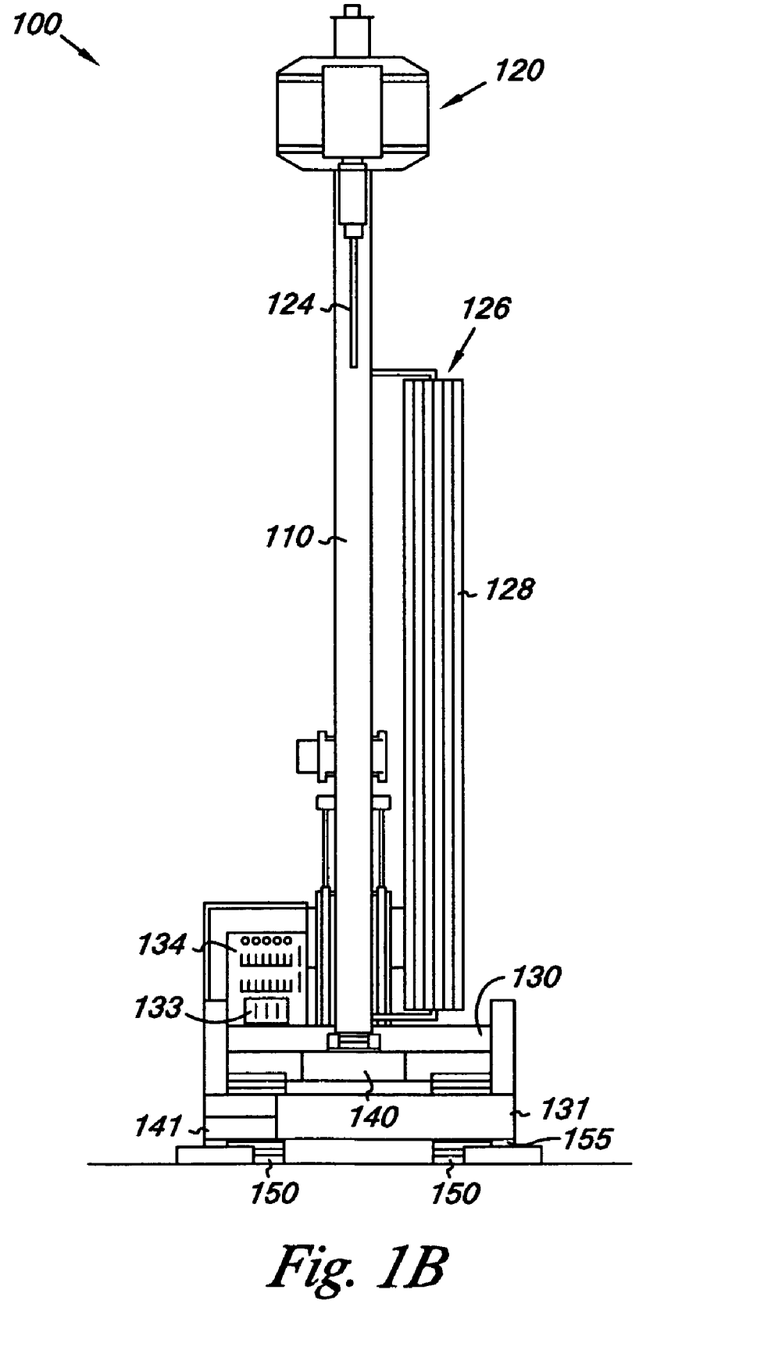
FIG. 1B is a rear view of the rotary driven well drilling rig shown in FIG. 1A.

FIGS. 1A and 1B are a side view and a rear view, respectively, of a rotary driven well drilling rig 100 according to an embodiment of the present disclosure. As shown in the embodiment illustrated in FIG. 1A, drill rig 100 includes a deck 130 having a mast 110 attached thereto. Mast 110 can be moved between a horizontal position and a vertical position via hydraulic cylinder 132. In various embodiments of the present disclosure, the mast 110 is moved to the horizontal position for transporting rig 100 from one drilling site to another. The mast 100 can be moved to a vertical position as shown in FIGS. 1A and 1B in order to drill vertical boreholes or to various positions between the horizontal and vertical positions in order to drill boreholes at angles less than vertical, e.g., less than 90 degrees with respect to the ground surface. As discussed below, in various embodiments, the drill rig 100 is configured such that mast 110 may remain in the vertical or a substantially vertical position during consecutive borehole drilling operations.

The drill rig 100 includes a head drive unit 120 that is movably attached to the mast 110. The head drive 120 can move linearly along mast 110 and can pivot longitudinally around mast 110 in order to retrieve drill pipes 128 from a drill pipe carousel 126 during a borehole drilling operation. The embodiment illustrated in FIGS. 1A and 1B show a vertical drill pipe carousel 126. However, embodiments are not limited to a vertical carousel attached to mast 110. For example, in some embodiments, the drill pipes 128 can be stacked in an elongated storage tray attached to the deck 130 and can be moved between the drill shaft 124 and the storage tray by using a cable or other suitable hoisting device as are known in the art.

The head drive 120 can be moved upward and downward via a pair of chains or other means known in the art. The head drive unit 120 includes a drive shaft 124 having male threads at a lower end 125. During a borehole drilling operation, drive shaft 124 is rotatably secured to a drill pipe segment 128 by mating with female threads (not shown) at one end of a drill pipe 128. Embodiments are not limited to this example.

As will be understood by those of ordinary skill in the art, each drill pipe 128 can have a female threaded end and a male threaded end. The female end can be secured to drive shaft 124 or to a male end of another drill pipe to form a drill string. The lowermost drill pipe 128 in a drill string can have a cutting bit (not shown) attached thereto, as the same are known in the art. In operation, the head drive unit 120 rotates drive shaft 124 and is moved downward along mast 110 in order to rotatably drive a drill string into the ground surface to form a borehole.

Drill rig 100 also includes a pumping unit 136 ("mud pump") on deck 130. The pumping unit 136 delivers drilling fluid to the head drive 120 via a conduit, such as a hose, from the pumping unit 136 to a connector 122 on head drive 120. The drilling fluid can be bentonite mixture such as Quick Gel or a liquid polymer such as EZ Mud, among various other drilling fluids. The drilling fluid is delivered through the inside of drive shaft 124 and down through its lower end. The drilling fluid passes from the drive shaft 124 down through the insides of the drill pipes 128 in a drill string and down through the bit end of the first drill pipe 128 in the string. The pressure from pumping unit 136 forces the drilling fluid out of the bit end of the string such that the drill "cuttings" flow up to the surface of the borehole on the outside of the drill string.

In the embodiment illustrated in FIGS. 1A and 1B, the deck unit 130 includes a mud pan 131 attached thereto. In various embodiments, the mud pan 131 can store drill cuttings produced during borehole drilling operations in order to maintain an area around drill rig 100 substantially free of the cuttings.

As shown in FIGS. 1A and 1B, in various embodiments of the present disclosure, the deck unit 130 is mounted on a turret 140 attached to a set of tracks 150, e.g., caterpillar tracks, to drill a number of geothermal boreholes as further discussed in detail below in connection with FIGS. 2 and 3.

In various embodiments, and as discussed below in connection with FIG. 4, the drill rig 100 can be configured such that air or fluid can be delivered via a conduit through the turret 140. For example, in various embodiments, the turret 140 includes an opening through which one or more hoses can pass in order to deliver air and/or water/and or drilling fluid to/from various components of drill rig 100, e.g., mud pump 136, head drive 120, hydraulic pumps 137, etc. Configuring drill rig 100 in this manner can reduce and/or prevent occurrences of hoses being twisted and/or damaged during geothermal borehole drilling operations as discussed herein.

In various embodiments, the tracks 150 are composed of metal and/or rubber and can be configured such that drill rig 100 exerts a reduced pressure on the ground surface as compared to conventional geothermal borehole drilling rigs, e.g., truck mounted drilling rigs. In some embodiments, the tracks 150 of track mounted drill rig 100 are configured such that a pressure less than 20 pounds per square inch (psi) is exerted on the ground surface. In one embodiment, the tracks 150 are configured to exert a ground surface pressure of less than 10 psi. In another embodiment, the tracks 150 are configured to exert a ground surface pressure of not more than 5 psi. In various embodiments, the tracks 150 can also provide reduced damage to landscaping upon moving drill rig 100 at a drilling site as compared to truck mounted drill rigs that can often create large tire ruts due to a higher exerted ground pressure that can be 45 psi or more.

In various embodiments, the drill rig 100 is configured to drill a number of geothermal boreholes by being positioned at a first location, e.g., the turret 140 can be positioned at the first location to drill a first borehole located at a second location, e.g., a location that is a radial distance from the turret 140. In such embodiments, the deck 130 can be pivoted on turret 140 while the turret 140 remains at the first location, e.g., at a stationary location relative to the ground surface, in order to drill a second borehole at a third location that is different than the second location and is located the radial distance from the first location. In various embodiments, the deck 130 is configured to rotate while the set of tracks 150 remain stationary. Drilling a number of boreholes without moving tracks 150 can reduce the amount of damage to various landscaping features at a geothermal heat loop installation site, for example.

The deck 130 also includes an operator cab 138 attached to a front end from which an operator can perform various operations such as positioning the tracks 150 at a location to drill a number of boreholes with drill rig 100. The drill rig 100 further comprises a fuel tank 139 and an engine 135 located adjacent to the cab 138 on deck 130. In the embodiment shown in FIGS. 1A and 1B, the fuel tank 139 and mud pump 136 are mounted beneath the deck and below the engine 135.

The engine 135 is attached to a number of hydraulic pumps 137 for providing power to hydraulic components of the rig 100 such as the hydraulic cylinder 132, the outriggers 155, the head drive unit 120, the turret 140, the tracks 150, etc. Electrical, petroleum, and hydraulic power systems can all be employed individually or in combination. Embodiments of the present disclosure are not limited to the example given here.

As illustrated in the embodiment shown in FIGS. 1A and 1B, the cab 138, fuel tank 139, engine 135, mud pump 136, and hydraulic pumps 137 are positioned at the end of deck 130 opposite the mast 110. The placement of these elements near the front end of deck 130 acts to balance the weight of the back end when the mast 110 is in an erected position. In various embodiments, the placement of these elements provides for the ability to rotate deck 130 on turret 140 while the mast 110 remains in a vertical or nearly vertical erected position. In this manner, various embodiments of drill rig 100 can drill consecutive boreholes in a circumference around turret 140 without lowering mast 110 and/or without moving rig 100 between consecutive borehole drilling operations.

The deck 130 in the embodiment shown in FIGS. 1A and 1B further includes a number of jacks 155, or outriggers, attached to the deck 130 and removably engagable with the ground surface during drilling operations. The jacks 155 can be used to stabilize drilling rig 100 during drilling and can be used to level drilling rig 100 when operating on uneven terrain, e.g., on an inclined surface.

The drill rig 100 also includes a control panel 134, as shown in FIG. 1B, comprising various gauges and controls for operating drill rig 100 to perform and/or monitor borehole drilling operations. The controls can be operated from an operator platform 141. Control panel 134 can include controls for erecting mast 110, raising/lowering head drive 120, lowering/raising jacks 155, operating pumping unit 136, and operating drive shaft 124 among various other operating controls for use in drilling boreholes with drill rig 100. For example, in this embodiment, the control panel 134 includes controls 133 which can be used to rotate the deck 130 and/or to operate tracks 150. In various embodiments and as shown in FIG. 1B, the control panel 134 is located at the rear end of deck 130 allowing an operator of control panel 134 to view the borehole drilling operation from the operator platform 141 while operating the controls. However, embodiments are not limited to a location of control panel 134 at the rear of deck 130.

Furthermore, in some embodiments, one or more of the controls of control panel 134, e.g., controls 133, may be disabled during borehole drilling operations. For instance, in some embodiments the controls 133 can be disabled, e.g., from operator cab 138, in order to prevent movement of the tracks 150 and/or deck 130 during borehole drilling. This can prevent damage to the various drilling rig components, e.g., the head drive 128, the drive shaft 124, etc., that can result from moving the tracks and/or deck during borehole drilling. In some embodiments, the control 133 for moving the tracks can be disabled while the control 133 for rotating the deck remains enabled. In such embodiments, an operator of control panel 134 may control rotation of the deck 130 on turret 140 but may not control movement of the tracks 150. This can allow an operator of control panel 134 to rotate the deck 130 to subsequent borehole drilling locations, which can facilitate accurate rotational positioning since the operator can view the positioning of the rig as the deck rotates.

In various method embodiments of the present disclosure, performing a borehole drilling operation by using drill rig 100 includes securing an attachment end (female threaded) of a first drill pipe 128 to the head drive unit 120 via a lower end 125 (male threaded) of drive shaft 124. The first drill pipe includes a drill bit (not shown) at its other end. The method includes activating the mud pump 136 to deliver the drilling fluid through the first drill pipe 128 and drill bit and activating the head drive unit 120 to rotate the first drill pipe 128 and to move the head drive 120 down along mast 110 to force the drill bit into the ground surface. The method includes deactivating the head drive unit 120 and mud pump 136 and detaching the head drive 120 from the first drill pipe 128 when the first drill pipe has penetrated into the surface sufficiently and a next drill pipe 128 is to be added to the drill string to continue drilling to a greater depth.

In various method embodiments, when the drilling depth is to be continued, the method further includes raising the head drive 120 from a lowermost position and securing a second drill pipe 128 to the attachment end of the first drill pipe 128, e.g., the current uppermost drill pipe of the drill string, and to the head drive 120 to thereby extend the drill string and continue drilling into the surface. The method includes reactivating the mud pump 136 to deliver drilling fluid through the drill string and reactivating the head drive 120 to rotate the drill string. The method further includes lowering the drill string further into the surface until the drill head drive 120 reaches the lowermost position or until the string reaches a desired depth below the surface, e.g., an appropriate depth for a geothermal heat loop such as 150-250 feet. The method includes adding additional drill pipes 128 to the drill string if the desired depth has not been reached.

Figure 2:
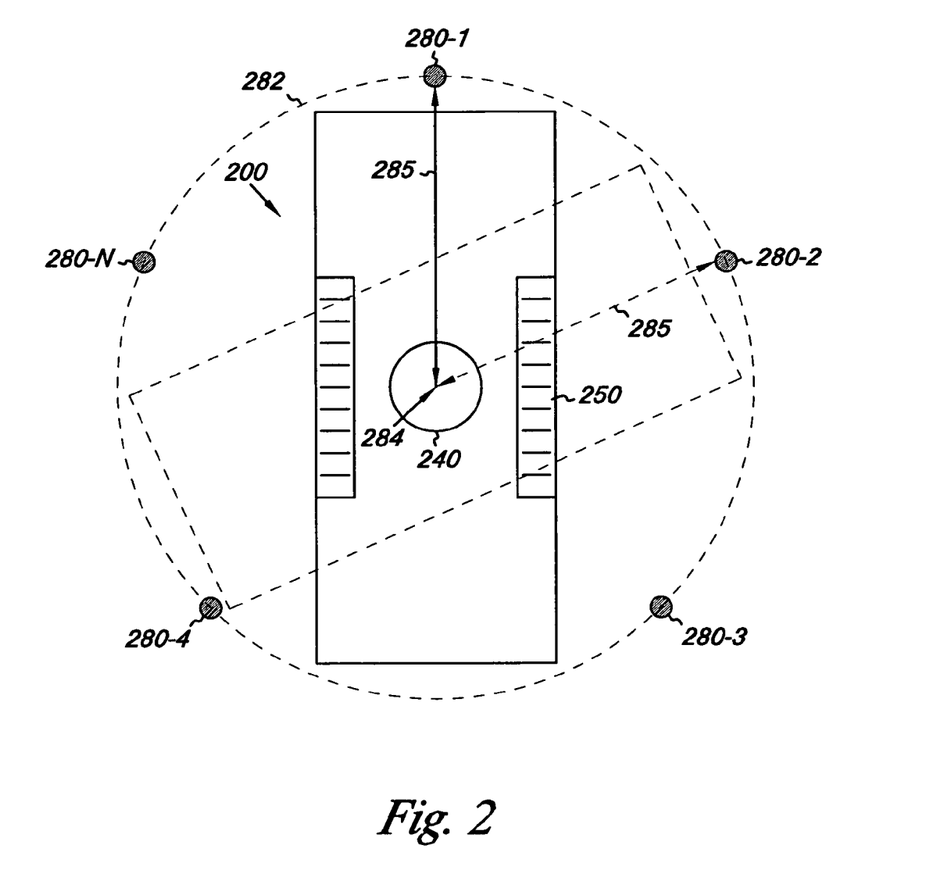
FIG. 2 is an overhead view showing borehole placement according to an embodiment of the present disclosure.

FIG. 2 is an overhead view showing borehole placement according to an embodiment of the present disclosure. The embodiment illustrated in FIG. 2 shows a number of borehole locations 280-1, 280-2, . . . 280-N each located a radial distance 285 from turret 240 of drill rig 200, which is positioned over a fixed location 284 of the drilling surface, e.g., the ground surface. The designator "N" is used to indicate that embodiments can include a number of borehole locations. In this embodiment, the boreholes 280-1 to 280-N are evenly spaced around a circumference 282 the radial distance 285 from turret 240, however embodiments are not limited to evenly spaced boreholes or to boreholes spaced circumferentially around a turret, e.g., turret 240.

In the embodiment illustrated in FIG. 2, the number of boreholes 280-1 to 280-N can be drilled by rotating deck 230 on turret 240 while the turret 240 remains positioned over fixed location 284, e.g., a center of the turret remains stationary relative to the ground surface. In various embodiments, the deck 230 is configured to rotate through 360 degrees. Also, in various embodiments and as shown in FIGS. 4A and 4B, the turret of rig 200 can be configured such that one or more conduits, e.g., hoses, can pass through the turret to reduce/prevent twisting and/or damage to the hoses during drilling operations. In various embodiments, the number of boreholes 280-1 to 280-N can be drilled while the tracks 250 remain stationary with respect to the ground surface.

By way of example and not by way of limitation, in various embodiments, the boreholes 280-1 to 280-N have a diameter of 4 inches and are drilled to a depth of 200 feet. Embodiments of the present disclosure may include drilling boreholes which have diameters greater or less than 4 inches and/or depths greater or less than 200 feet. In various embodiments, one or more of the boreholes 280-1 to 280-1 are geothermal boreholes into which geothermal heat loops can be placed. In some such embodiments, the boreholes 280-1 to 280-N around circumference 282 are spaced apart by at least 8 feet. For example, in one embodiment, the boreholes are evenly spaced by about 12 feet around a 60 foot circumference. In such an embodiment, the boreholes are a radial distance (r) 285 of about 10 feet from the center of the circumference, e.g., location 284 centered with the turret 240. The spacing between the boreholes can depend on various factors including the depth of the boreholes, drilling conditions, and geological conditions, among other factors.

Figure 3:
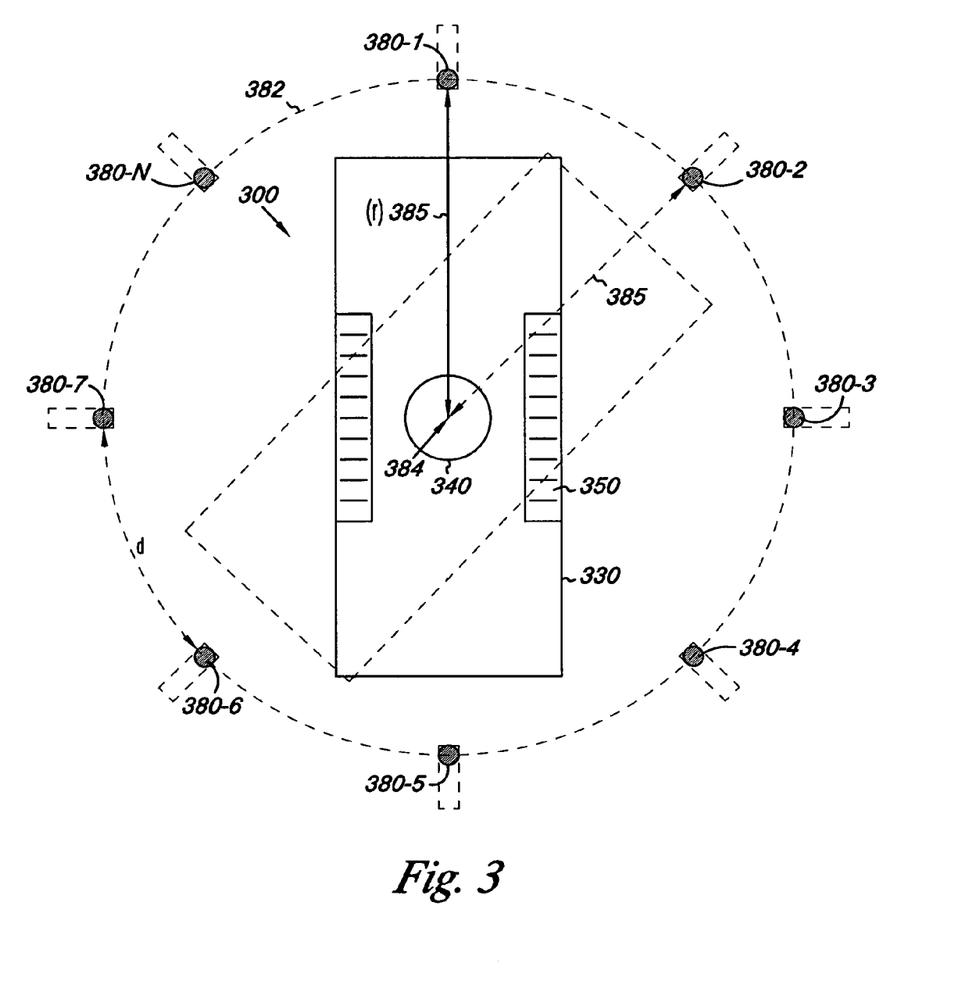
FIG. 3 is an overhead view showing borehole placement according to another embodiment of the present disclosure.

FIG. 3 is an overhead view showing borehole placement according to another embodiment of the present disclosure. The embodiment illustrated in FIG. 3 shows a number of geothermal borehole locations 380-1, 380-2, . . . 380-N each located a radial distance (r) 385 from turret 340 of drill rig 300, which is positioned over a fixed location 384 of the drilling surface, e.g., the ground surface. The designator "N" is used to indicate that embodiments can include a number of borehole locations.

The embodiment illustrated in FIG. 3 is similar to the embodiment illustrated in FIG. 2. In this embodiment, the geothermal boreholes 380-1 to 380-N are each angled radially outward from the turret 340. Angling the entry points of boreholes 380-1 to 380-N into the ground surface may allow the boreholes to be spaced more closely together in order to reduce/prevent geothermal heat loops placed in those boreholes from overly competing for ground thermal energy. That is, angling the boreholes 380-1 to 380-N can mitigate the competition for ground thermal energy between adjacent geothermal heat loops.

In some embodiments, the boreholes 380-1 to 380-N are angled outward by at least 15 degrees which can reduce heat exchange between adjacent geothermal boreholes, e.g., 380-1 and 380-2, as the distance between the adjacent boreholes increases with drilling depth. As shown in FIG. 3, in one embodiment, 8 geothermal boreholes can be drilled around a circumference 382. In this embodiment, the 8 boreholes are evenly spaced around a circumference 382 of about 75 feet, by a distance (d) of about 9 feet. In this example, each of the 8 boreholes are placed a radial distance (r) 385 of about 12 feet from the center of the circumference, e.g., location 384 centered with the turret 340. Embodiments are not limited the number of geothermal boreholes or angles at which they are drilled. More or fewer geothermal boreholes can be radially spaced around the circumference according to various embodiments.

As in the embodiment shown in FIG. 2, in the embodiment illustrated in FIG. 3, the number of boreholes 380-1 to 380-N can be drilled by rotating deck 330 on turret 340 while the turret 340 remains positioned over fixed location 384. In various embodiments, the deck 330 is configured to rotate through 360 degrees. In some embodiments the deck 330 is configured to rotate less than 360 degrees. Also, in various embodiments and as discussed in connection with FIGS. 4A and 4B, the turret of rig 300 can be configured such that one or more conduits, e.g., hoses, can pass through the turret to reduce/prevent twisting and/or damage to the hoses during drilling operations. In various embodiments, the number of boreholes 380-1 to 380-N can be drilled while the tracks 350 remain stationary with respect to the ground surface. That is, the tracks 350 do not have to be moved while rotating the deck 330 for performing the various borehole drilling operations 380-1 to 380-N.

By way of example and not by way of limitation, in various embodiments, the boreholes 380-1 to 380-N have a diameter of 4 inches and are drilled to a depth of 200 feet. Embodiments of the present disclosure may include drilling boreholes which have diameters greater or less than 4 inches and/or depths greater or less than 200 feet.

Figure 4A:
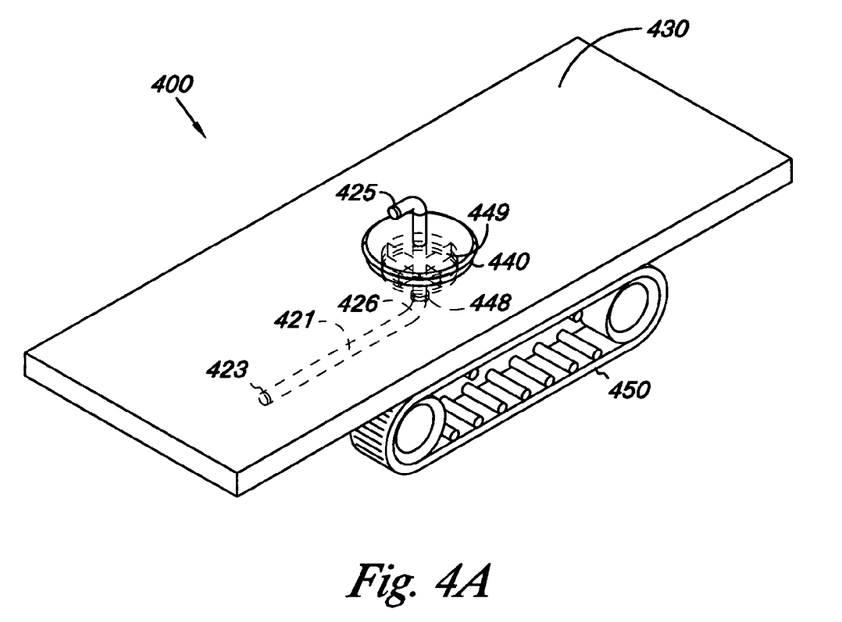
FIG. 4A illustrates more detail of a turret embodiment having a conduit therethrough according to the present disclosure.
Figure 4B:
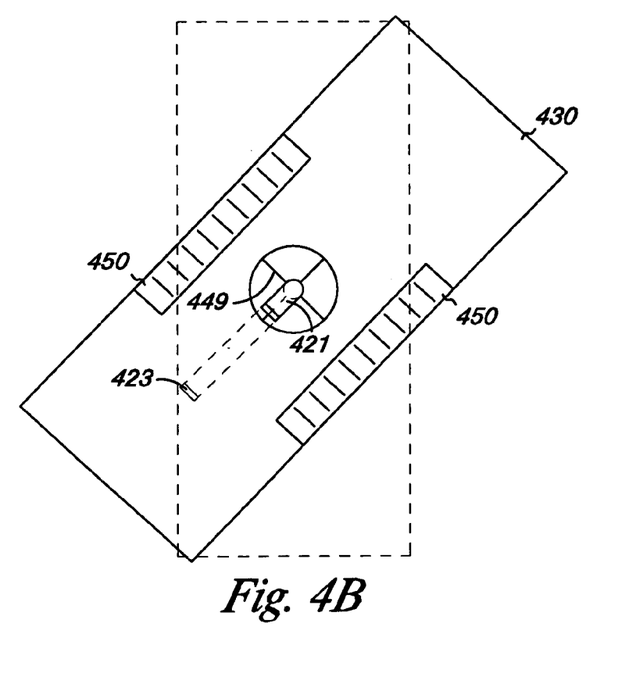
FIG. 4B illustrates an overhead view of the embodiment shown in FIG. 4A.

FIGS. 4A and 4B illustrate more detail of a turret embodiment 400 having a conduit 421 therethrough according to the present disclosure. FIG. 4B illustrates an overhead view of the embodiment shown in FIG. 4A. In this embodiment, the conduit 421 can be an enclosed passageway through which one or more hoses can pass to deliver drilling fluid to a head drive unit, e.g., head drive unit 120 as shown in FIGS. 1A and 1B, during borehole drilling operations. Similarly, electrical wiring can pass through conduit 421. As shown in the embodiment illustrated in FIGS. 4A and 4B, the conduit 421 passes between the tracks 450 and up through an opening in the turret 440 and the deck 430. As one of ordinary skill in the art will appreciate, the conduit 421 can be attached or connected to the turret 440 by suitable attachment means, e.g., rods 449 in FIGS. 4A and 4B.

According to various embodiments, each end of the conduit 421 can include mating attachments 423 and 447, e.g., quick couplers, such that a hose can be connected thereto. For example, a hose can be attached to mating attachment 447 and connected on to a pumping unit of the drill rig, e.g., mud pump 136 as shown in FIG. 1A, for further connection and pumping action to a head drive connector, e.g., 122 as shown if FIG. 1A.

In various embodiments, the conduit 421 can include one or more bends 442 and 443 which can include a swivel 448. As an example, the swivel 428 can be a ninety degree elbow swivel which can reduce or prevent damage to the hose 421 by preventing it from twisting and/or knotting as the deck rotates on turret 440 during borehole drilling operations as described herein. In the embodiment illustrated in FIGS. 4A and 4B, the end of conduit 421 that passes between tracks 450 includes a mating attachment 423, e.g., a quick coupler, for releasably attaching to a fluid source, e.g., a water tank, via another conduit such as another hose segment, for example.

Figure 5:
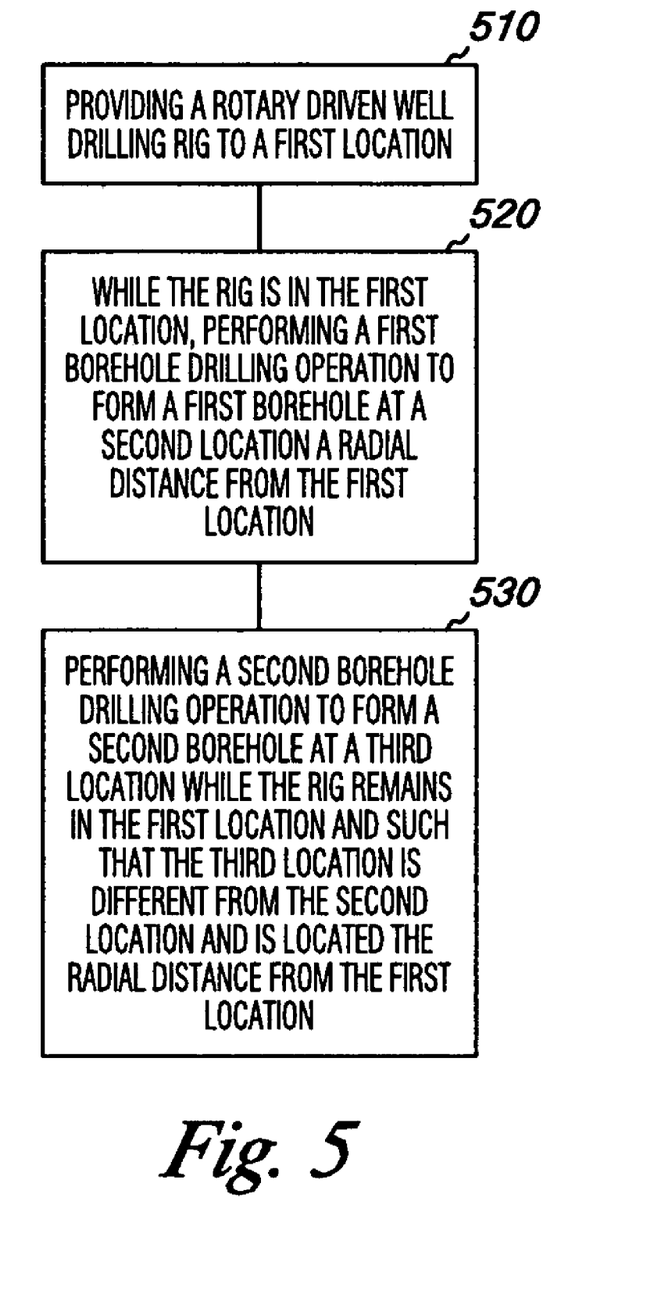
FIG. 5 illustrates a method for geothermal borehole installation according to an embodiment of the present disclosure.

FIG. 5 illustrates a method for geothermal borehole installation according to an embodiment of the present disclosure. At block 510 the method includes providing a rotary driven well drilling rig, e.g., rig 100 of FIGS. 1A and 1B, to a first location, e.g. location 284 as shown in FIG. 2.

As illustrated in block 520 of the embodiment shown in FIG. 5, the method includes, while the rig is in the first location, performing a first borehole drilling operation to form a first borehole at a second location, e.g., location 280-1 of FIG. 2 or 380-1 of FIG. 3, a radial distance, e.g., 285 of FIG. 2 or 385 of FIG. 3, from the first location, e.g., location 284 of FIG. 2 or 384 of FIG. 3. Using the embodiment of FIG. 2 as an example, the method can include forming a first borehole 280-1 while the rig 200 is in a first location, e.g., rig 200 is positioned such that turret 240 is located over location 284, such that the first borehole 280-1 is positioned a radial distance 285 from turret 240 and/or location 284. That is, the center of turret 240 can remain stationary relative to the ground surface location 284 between subsequent borehole drilling operations.

In the method embodiment illustrated in FIG. 5 at block 530, the method includes performing a second borehole drilling operation to form a second borehole at a third location without having to move the tracks, e.g., tracks 350 of FIG. 3, while the drill rig remains in the first location. As described herein, the third location, e.g., location 380-2 of FIG. 3, is different from the second location and can be located the same radial distance from the first location. As another example, using the embodiment of FIG. 2, the method can include forming a second borehole at a third location, e.g., 280-2, without having to move the tracks 250, while the drill rig 200 remains at the first location 284. As such, borehole 280-2 can thus be located at a different location than borehole 280-1 and located the radial distance 285 from the first location 284. To achieve the same, the deck 230 of rig 200 can pivot on turret 240 to drill borehole 280-2 while the drill rig 200 remains at the first location 284. As the reader will appreciate, in various embodiments, the radial distance may vary if different boreholes are drilled at different angles, e.g., if some boreholes are drilled vertically and some at angles away from vertical.

Subsequent boreholes, e.g., 280-3, 280-4 . . . 280-N, can be formed by repeating the above described sequence and methodology. As mentioned above, in various embodiments, the drilling rig can be configured such that the erectable mast of rig can remain in a vertical erected position while the deck rotates. That is, in various embodiments, borehole drilling operations subsequent to a first borehole drilling operation can be performed without fully having to move the vertical orientation of the erectable mast after drilling a first borehole. As the reader will appreciate, the erectable mast may be partially lowered to achieve angled drilling operations as described in connection with FIG. 3. In such embodiments, the deck can rotate while the erectable mast is in the partially lowered position in order to perform subsequent angled borehole drilling operations.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled. In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for geothermal heat loop installation, comprising:
   providing a rotary driven well drilling rig, the drilling rig comprising:
   an erectable mast;
   a head drive unit capable of linear movement along the mast for rotatably driving drill pipes into a surface;
   a pumping unit to deliver a fluid through a drill pipe secured to the head drive, the fluid being towed out a bottom end of the drill pipe and up to the surface along the outside of the drill pipe during a borehole drilling operation; and
   a deck unit pivotally mounted on a turret attached to a set of tracks, the deck unit supporting the mast, and wherein the turret includes an opening having a conduit passing therethrough, the conduit capable of attachment to a hose to provide a fluid source to the pumping unit;

while the rig is in a first location, performing a first borehole drilling operation to form a first borehole at a second location, the first borehole formed to receive a geothermal heat loop; and performing a second borehole drilling operation to form a second borehole at a third location while the rig remains in the first location.

2. The method of claim 1, wherein the method includes:
positioning the turret at the first location;
performing the first borehole drilling operation such that the second location is a radial distance from the first location; and
performing the second borehole drilling operation such that the third location is different from the second location and is located the radial distance from the first location.

3. The method of claim 2, wherein performing the second borehole drilling operation includes rotating the deck unit on the turret without moving the set of tracks.

4. The method of claim 3, wherein rotating the deck unit includes rotating the deck unit while the mast is in an erected position.

5. The method of claim 1, wherein the method includes performing at least four borehole drilling operations to form the first and the second, and a third and a fourth borehole while the rig remains in the first location such that the first, second, third, and fourth boreholes are located a radial distance from the first location.

6. The method of claim 5, wherein the method includes performing the at least four borehole drilling operations such that the first, second, third, and fourth boreholes are evenly spaced circumferentially around the first location.

7. The method of claim 5, wherein the method includes performing each of the at least four borehole drilling operations such that the first, second, third, and fourth boreholes are each angled radially outward.

8. The method of claim 1, wherein performing a borehole drilling operation comprises:
securing an attachment end of a first drill pipe to the head drive unit, the first drill pipe attachable to a drill bit;
activating the pumping unit to deliver the fluid through the first drill pipe and the drill bit;
activating the head drive unit to rotate the first drill pipe and move the unit along the mast to force the drill bit into the surface; and
deactivating the head drive unit and pumping unit and detaching the head drive unit from the first drill pipe when the head drive unit reaches a lowermost position.

9. The method of claim 8, wherein performing a borehole drilling operation further comprises:
raising the head drive unit and securing a second drill pipe to the attachment end of the first drill pipe and to the head drive unit to form a drill string;
reactivating the pumping unit to deliver the fluid through the string;
reactivating the head drive unit to rotate the string;
lowering the string further into the surface until the drill head drive unit reaches the lowermost position or until the string reaches a desired depth below the surface; and
adding additional drill pipes to the drill string if the desired depth has not been reached.

10. The method of claim 1, wherein performing at least one of the borehole drilling operations includes drilling a borehole at an angle less than 90 degrees with respect to the surface.

11. The method of claim 1, wherein performing each of the borehole drilling operations includes drilling boreholes having a diameter of about four inches to a depth of about 200 feet.

12. A rotary driven well drilling apparatus for installation of geothermal loops comprising:
a deck having an erectable mast attached thereto;
a head drive unit to rotatably drive a number of drill pipes into a ground surface in order to form a geothermal borehole capable of housing a geothermal loop, the number of drill pipes forming a drill pipe string, and the head drive unit being attached to the erectable mast and capable of linear movement thereon;
a pumping unit to deliver a fluid through the drill pipes during a drilling operation, the fluid being delivered through the inside of the drill pipes at a top end of the string and flowing upward toward the ground surface on the outside of the drill string after passing through a drill bit of the drill string; and
wherein the deck is mounted on a turret attached to a set of tracks to drill a number of geothermal boreholes, and wherein the turret includes an opening having a conduit passing therethrough, the conduit capable of attachment to a hose to provide a fluid source to the pumping unit.

13. The apparatus of claim 12, wherein the apparatus includes a carousel attached to the mast for holding the number of drill pipes and wherein the head drive pivots to remove drill pipes from the carousel and return drill pipes to the carousel during the drilling operation.

14. The apparatus of claim 12, wherein the apparatus is configured such that the mast can remain in an erected position while the deck is rotated on the turret.

15. The apparatus of claim 12, wherein the apparatus is configured such that the apparatus exerts a pressure of less than 20 pounds per square inch (psi) upon the ground surface.

16. The apparatus of claim 12, wherein the apparatus includes a mud pan attached to the apparatus to receive cuttings from the drilling operation.

17. The apparatus of claim 12, wherein the turret is positioned at a first location relative to the ground surface to drill a first geothermal borehole at a second location, wherein the second location is a radial distance from the turret, and wherein the turret is rotatable to rotate the deck while the turret remains at the first location to drill a second geothermal borehole at a third location, the third location being different than the second location and located the radial distance from the first location.

18. The apparatus of claim 12, wherein the deck is configured to rotate while the set of tracks remain stationary to drill the number of geothermal boreholes a radial distance from the turret.

19. A rotary driven well drilling apparatus for installation of geothermal loops comprising:
a deck having an erectable mast attached thereto;
a head drive unit movably attached to the mast and capable of linear movement thereon to rotatably drive a number of drill pipes into a ground surface by using a drive shaft having threads on a lower end for removably engaging threads on the number of drill pipes in a drill string in order to form geothermal boreholes;
a pumping unit to deliver a drilling fluid to the head drive unit such that the drilling fluid passes through the lower end of the drive shaft and down through a drill bit end of the drill string during a drilling operation; and wherein the deck is rotatably mounted on a turret attached to a set of caterpillar tracks to perform a plurality of drilling operations at a first location of the turret relative to the ground surface in order to drill a plurality of geothermal boreholes a radial distance from the first location while the turret remains at the first location, the geothermal boreholes to receive a geothermal loop; and wherein the drilling fluid is delivered to the head drive via a conduit passing between the caterpillar tracks and up through the turret.

20. The apparatus of claim 19, wherein deck is configured to rotate on the turret through 360 degrees.

21. The apparatus of claim 19, wherein the apparatus includes a number of jacks attached to the deck and removably engagable with the ground surface during drilling operations.

* * * * *